(12) United States Patent
Szumer

(10) Patent No.: US 6,463,666 B1
(45) Date of Patent: Oct. 15, 2002

(54) MEASURING AND LEVELING DEVICE AND METHOD OF USING SAME

(75) Inventor: Emmanuel Szumer, Kibbutz Kadarim (IL)

(73) Assignee: Kapro Industries Ltd., MP Bikat Hakerem (IL)

( * ) Notice: Subject to any disclaimer, the term of this patent is extended or adjusted under 35 U.S.C. 154(b) by 40 days.

(21) Appl. No.: 09/630,536

(22) Filed: Aug. 1, 2000

(51) Int. Cl.[7] .............................. G01B 3/04; B43L 7/08
(52) U.S. Cl. ........................................... 33/484; 33/451
(58) Field of Search .......................... 33/484, 333, 334, 33/354, 374, 376, 404, 451, 485, 486, 487, 490, 491, 613, 645

(56) References Cited

U.S. PATENT DOCUMENTS

| | | | | |
|---|---|---|---|---|
| 867,556 A | * | 10/1907 | Campbell | 33/451 |
| 1,963,805 A | * | 6/1934 | Radke et al. | 33/376 |
| 2,456,676 A | * | 12/1948 | Chowns | 33/486 |
| 2,720,705 A | * | 10/1955 | Vincent | 33/374 |
| 3,302,233 A | * | 2/1967 | Sebastiani | 33/334 |
| 4,241,510 A | * | 12/1980 | Radecki | 33/451 |
| 4,964,219 A | * | 10/1990 | Clark | 33/451 |
| 5,083,380 A | * | 1/1992 | Robertson | 33/485 |
| 5,430,947 A | * | 7/1995 | Courtney | 33/485 |

* cited by examiner

*Primary Examiner*—Christopher W. Fulton
(74) *Attorney, Agent, or Firm*—Edward Langer

(57) ABSTRACT

A measuring and leveling device constructed with bubble vials for leveling which are movable to the precise point of application, with the measuring scale situated on a surface so constructed as to allow the scale to be located directly against and parallel to the surface to be measured. The device serves for both measuring and leveling tasks in one tool, and is constructed including a body portion provided with a ruler for measuring distances between points, in which the measuring scale is marked on a surface which tapers to a flat edge as in a conventional ruler. The body portion has two parallel tracks along its longitudinal axis, and two clamps situated on the body of the leveling device, each of which is held in place by tabs situated on the underside of the clamps and insertable into the parallel tracks, each clamp including a bubble vial mounting portion into which a bubble vial is fixedly mounted. The present invention therefore enables two or more points to be easily and accurately marked on a surface at a set horizontal or vertical distance one from the other; or a level horizontal or vertical line to be easily and accurately marked or cut on a surface. The sliding nature of the clamps on which the bubble vials are mounted enables the bubble vials to be positioned at either end of the surface to be plumbed, thus serving as both measuring and plumbing points, allowing for simultaneous measurement and alignment. The measuring and leveling device is ideal for use in many applications where leveling and marking are required, such as hanging framed works of ant or pictures on walls, or measuring a distance between two points, such as between hanging holes on the back of a cabinet, enabling these two points to be marked on a wall, such that the points are accurately leveled. The measuring and leveling device can also be used in any other application, such as in doing construction or renovation, marking stud placements in plasterboard walls and the like.

16 Claims, 2 Drawing Sheets

MEASURING AND LEVELING DEVICE AND METHOD OF USING SAME

FIELD OF THE INVENTION

The present invention relates generally to measuring and leveling devices, and particularly to an apparatus for both measuring and leveling a plane surface in which bubble vials are situated on clamps which can be moved along the plane of the body.

BACKGROUND OF THE INVENTION

Spirit levels are well-known tools used to set or plumb surfaces. This is accomplished by placing a plumb face of the spirit level against a surface to be plumbed, and checking the levelness by observing the position of a bubble in a bubble vial. The plumb face of the spirit level is finished or machined to a desired level of accuracy. Sufficiently accurate carpenter levels have been made of wood or plastic, although highly accurate levels are generally made of lightweight metal, such as aluminum.

A workman is frequently faced with the problem of marking at least two points on a surface, or of drawing or cutting a line on a surface, (most commonly a vertical surface such as a wall), such that the two points are horizontally or vertically orientated one to the other, or the line is vertically or horizontally leveled A drawback of conventional spirit levels is that they enable a surface to be leveled, but not measured Using a conventional spirit level therefore necessitates the use of an additional tool, such as a ruler, in order to carry out both tasks. This may prove to be cumbersome and time-consuming, requiring the processes to be performed as two separate activities.

In an attempt to overcome the problems of separate leveling and measuring tools, a spirit level has been developed which provides bubble vials for leveling, in combination with a ruler for measuring. However, a disadvantage of these devices is that the bubble vials are located at a fixed position, typically at either end of the ruler, making the device cumbersome to use and resulting in the bubble vials being situated at some distance from the point of application.

A further disadvantage of spirit levels provided with a scale is that due to the typical rectangular cross-section of the level, the scale is usually marked on the surface perpendicular to the surface to be measured, making reading of the scale somewhat difficult, or the scale is marked on the surface parallel and substantially removed from the surface being measured, thus making accurate marking difficult, Therefore, it would be desirable to provide a measuring and leveling device in one unit, having bubble vials which are movable to a required point along the body of the ruler, and having a scale which is marked on a surface which can be placed directly against and parallel to the surface to be measured.

SUMMARY OF THE INVENTION

Accordingly, it is a principal object of the present invention to overcome the disadvantages of the prior art measuring and leveling devices and provide a device in which the bubble vials for leveling are movable to the precise point of application, and the measuring scale is situated on a surface so constructed as to allow the scale to be located directly against and parallel to the surface to be measured.

In accordance with the preferred embodiment of the present invention, there is provided a measuring and leveling device including a body portion provided with a ruler for measuring distances between points, in which the measuring scale is marked on a surface which tapers to a flat edge as in a conventional ruler, and having two parallel tracks along the longitudinal axis of the body, and two clamps situated on the body of the leveling device, each of which is held in place by tabs situated on the underside of the clamps and insertable into the parallel tracks, each clamp including a bubble vial mounting portion into which a bubble vial is fixedly mounted.

The present invention therefore enables two or more points to be easily and accurately marked on a surface at a set horizontal or vertical distance one from the other; or a level horizontal or vertical line to be easily and accurately marked or cut on a surface.

Heretofore, for example, in order to hang a picture on a wall it was necessary to make and mark all the measurements with a measuring tape or ruler and then use a level to align the picture once it was mounted. The present invention serves for both these tasks in one tool, obviating the need for a separate ruler or measure.

The sliding nature of the clamps on which the bubble vials are mounted enables the bubble vials to be positioned at either end of the surface to be plumbed, thus serving as both measuring and plumbing points, allowing for simultaneous measurement and alignment. The leveling and measuring device is ideal for use in hanging framed works of art or pictures on walls, since it not only allows for accurate, measured placement, but also for level alignment.

The measuring and leveling device may be used to measure a distance between two points, such as between hanging holes on the back of a cabinet, and mark these two points on a wall, such that the points are accurately leveled.

The leveling and measuring device can also be used in any other application where leveling and marking are required, such as in doing construction or renovation, marking stud placements in plasterboard walls and the like.

Other features and advantages of the invention will become apparent from the following drawings and description.

BRIEF DESCRIPTION OF THE DRAWINGS

For a better understanding of the invention in regard to the embodiments thereof, reference is made to the following drawings, in which like numerals designate c corresponding sections or elements throughout, and in which.

DETAILED DESCRIPTION OF A PREFERRED EMBODIMENT

Figure 1:
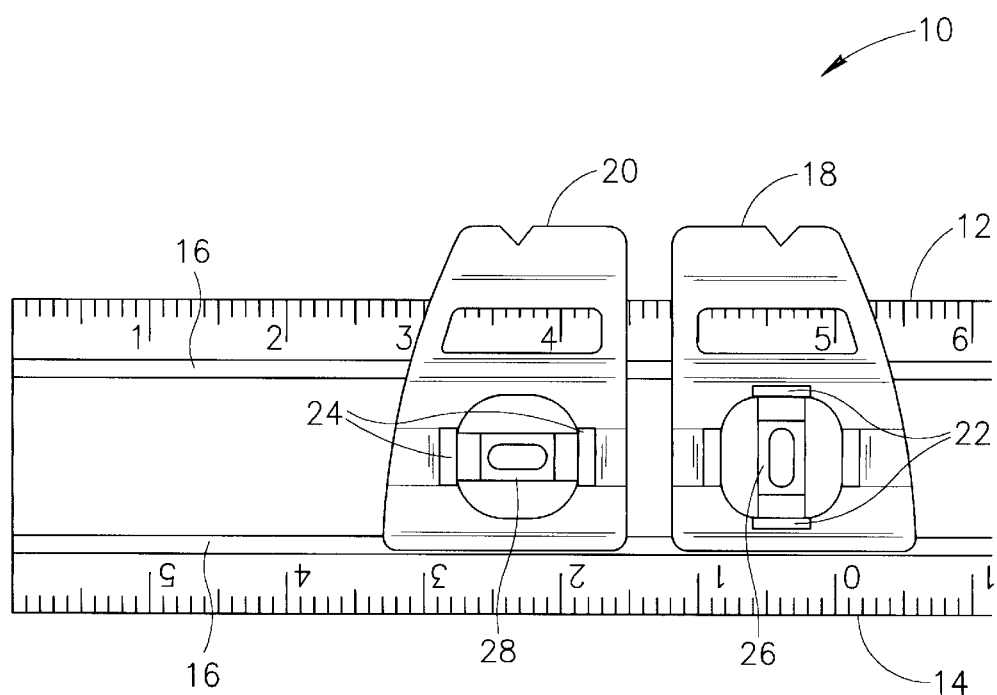
FIG. 1 illustrates an overall view of a section of a measuring and leveling device constructed and operative in accordance with a preferred embodiment of the present invention.

Reference is now made to FIG. 1, which illustrates an overall view of a measuring and leveling device 10 constructed and operative in accordance with the preferred embodiment of the present invention.

Measuring and leveling de vice 10 comprises two leveling surfaces 12 and 14, each surface being provided with a ruler for measuring distances between points. The surfaces taper to a flat edge, as in a conventional ruler, with the measuring scales marked along these flat edges. The body of device 10 contains two parallel retaining tracks 16, at equal distances from, and running parallel to leveling surfaces 12 and 14.

Two sliding clamps 18 and 20, formed with gripping tabs 34 protruding downwards from their lower surfaces are situated on the body of the spirit level, with gripping tabs 34 being adapted to lockably engage retaining tracks 16 in releasable fashion by insertion therein.

The sliding clamps 18 and 20 are each formed with a vial holder 22 and 24 respectively, on their upper surface. Details of the further construction of the vial holders and their arrangements on the clamps are described further herein with reference to FIGS. 3 and 4.

Bubble vial 28 constitutes a conventional horizontal alignment bubble vial and bubble vial 26 a vertical alignment bubble vial. Together, bubble vials 26 and 28 indicate to a user the level of a plane surface both in a horizontal and in a vertical plane and allow for accurate simultaneous horizontal and vertical alignment prior to measuring and marking such a surface.

The movable and lockable nature of sliding clamps 18 and 20, and with them, bubble vials 26 and 28, enables the user to fixedly position bubble vials 26 and 28 at the exact point of use. The lockable sliding clamps 18 and 20 can be fixedly positioned at opposite extremities of a surface to be marked and measured, enabling the distance between the two sliding clamps to be measured by reference to the ruler, and simultaneous alignment to be performed by reference to the two bubble vials 26 and 28, with no risk of inadvertently moving the clamps after positioning.

In accordance with the preferred embodiment of the present invention, leveling surfaces 12 and 14 are each provided with a ruler for measuring distances between points, the ruler of surface 12 being marked according to a linear scale beginning from zero at the left hand edge of surface 12, while the ruler of surface 14 is centered from zero and extends towards the left- and right-hand edges of the surface 14. The linear scale may be marked in centimeters or inches.

Figures 2A, 2B, 2C:
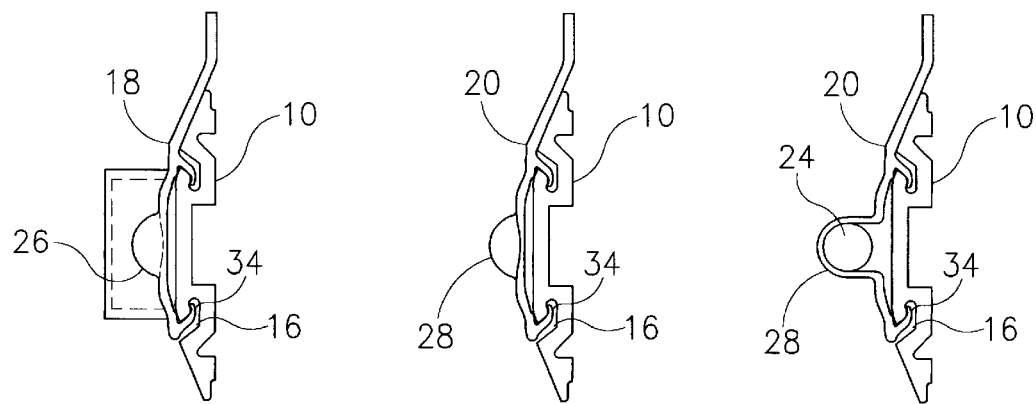
FIGS. 2a–c illustrate, respectively, a cross-section of the vertical bubble vial mounted on a sliding clamp, a side view of the horizontal bubble vial mounted on a sliding clamp, and an end view of the horizontal bubble vial contained within the vial holder on the sliding clamp.

Reference is now made to FIGS. 2a–c, which illustrate bubble vials 26 and 28 mounted on sliding clamps 18 and 20 respectively, situated on the body of device 10 and held by gripping tabs 34 within tracks 16.

FIG. 2a shows a cross-section of the vertical bubble vial 26 mounted on sliding clamp 18. FIG. 2b shows a side view of the horizontal bubble vial 28 mounted on sliding clamp 20. FIG. 2c shows an end view of the sliding clamp 20, in which bubble vial 28 is held, showing the vial holder 24.

Figure 3:
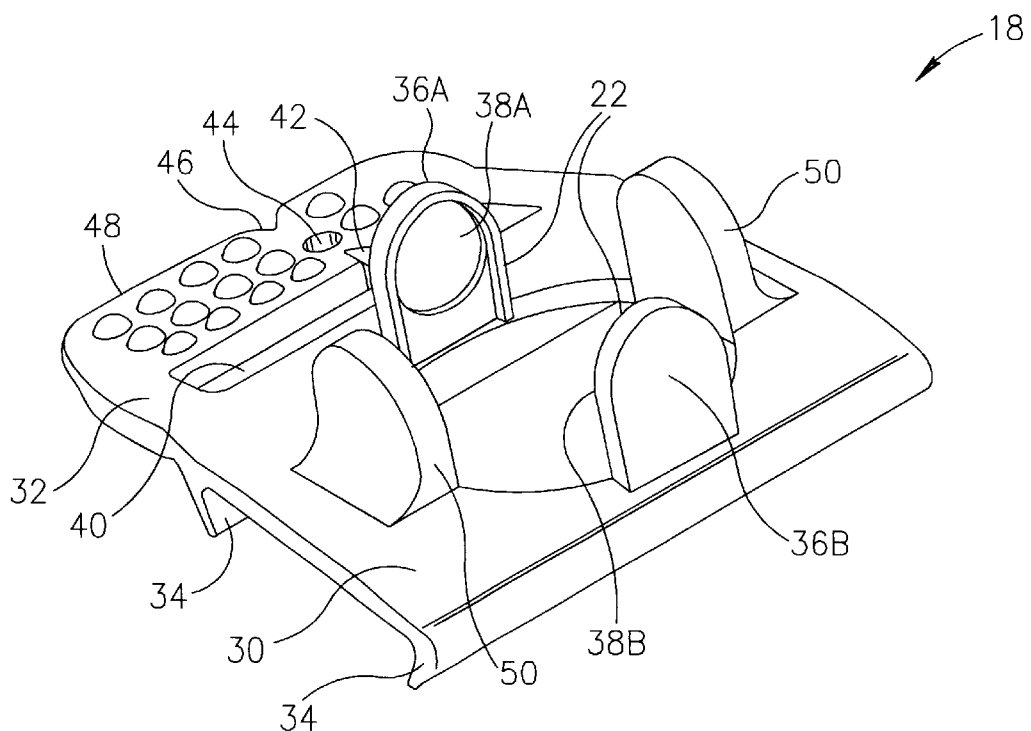
FIG. 3 illustrates the sliding clamp for containing the horizontal bubble vial.
Figure 4:
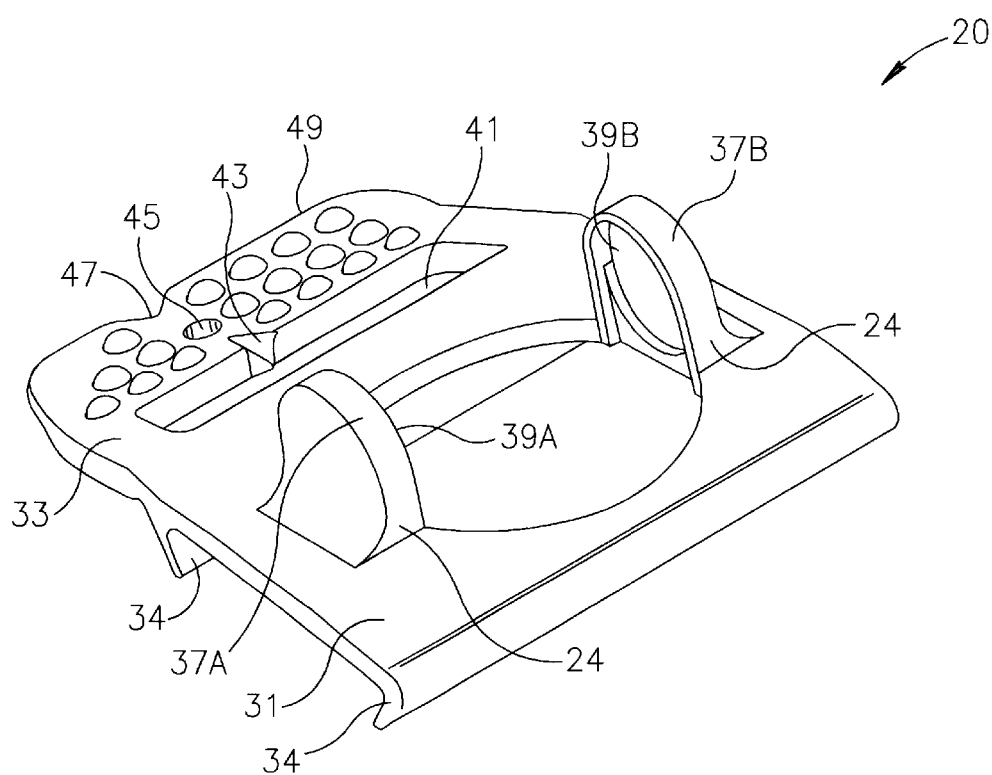
FIG. 4 illustrates the sliding clamp for containing the vertical bubble vial.

FIGS. 3 and 4 add further construction detail and show clamps 18 and 20 respectively, before insertion of bubble vials 26 and 28.

Referring now to FIG. 3, there is shown the molded-plastic sliding clamp 18 which comprises a main portion 30, a protruding end portion 32, and gripping tabs 34 formed on the underside of main portion 30, gripping tabs 34 being formed with an inwardly directed slant. The gripping tabs 34 are positioned within retaining tracks 16 and grip the edges of tracks 16.

Sliding clamp 18 is molded with a vertical bubble-vial holder 22, comprising two semi-elliptical holder sections 36a and 36b, extending perpendicular to the plane of main section 30 of clamp 18 and situated opposite each other along an axis perpendicular to that of leveling surfaces 12 and 14. Within each holder section 36a and 36b is formed a circular recess 38a and 38b, respectively, into each of which one end of the bubble vial 26 may be positioned.

In accordance with the preferred embodiment of the present invention, sliding clamp 18 is formed so as to provide a pointer window 40, for reading of the ruler scale and a pointer 42 for marking a point on the scale. The pointer 42 is aligned with the longitudinal axis of vertical bubble vial 26.

The protruding end section 32 of sliding clamp 18 is further provided with a marking hole 44, which may be used for accurate alignment of a marking. A notch 46 is provided on the outer surface of the protruding end piece 32, which may be used to for alignment of a marking instrument or for accurate placement of a drill bit, as may be the case in the most common applications for the apparatus. The notch 46 is particularly advantageous for fixing the position of the sliding clamp 18 in relation to a protrusion, such as a nail extending from a wall prior to measurement and alignment of the position of a subsequent nail.

The edges 48, 49 of protruding end pieces 32, 33 of each of respective clamps 18, 20 may be used to position device 10 against the surface to be leveled.

In accordance with the principles of the invention, the sliding clamp 18 is provided with positioning tabs 50, situated on either side of bubble vial 26. Application of a downward pressure to the main portion 30 of the sliding clamp 18, at the base of positioning tabs 50, causes slight distortion of the sliding clamp 18, leading to displacement of gripping tabs 34 relative to the edges of retaining tracks 16, and release of the gripping force exerted by the tabs 34 on the edges of retaining track 16. Positioning tabs 50 allow the user to apply a lateral force, enabling sliding clamp 18 to be moved to the desired position. Release of pressure on main portion 30 of clamp 18 will cause the gripping tabs 34 to grip the edges of retaining tracks 16, locking sliding clamp 18 in a fixed position Functioning of such a release mechanism relies on flexibility of the material of which the sliding clamp 18 formed. The choice of material must thus provide a sufficient level of rigidity to enable gripping tabs 34 to hold the sliding clamp 18 in a fixed position, but also provide sufficient flexibility to enable the slight distortion required for release.

FIG. 4, shows the sliding clamp 20, which provides a holder for the horizontal bubble vial 24. Clamp 20 comprises a main section 31, a protruding end section 33, and gripping tabs 34 molded on the underside. The tabs 34 are situated within the retaining tracks 16 and grip the edges of the tracks 16.

The sliding clamp 20 is molded with a horizontal bubble-vial holder 24, comprising two semi-elliptical holder sections 37a and b, extending perpendicular to the plane of the main section 31 of clamp 20, situated opposite each other along an axis parallel to that of the leveling surfaces 12 and 14. Within each holder section 37a and b is formed a circular recess 39a and b, respectively, in each of which one end of the horizontal bubble vial 28 may be positioned.

In accordance with the preferred embodiment of the present invention, sliding clamp 20 is molded so as to provide a pointer window 41, for reading of the ruler scale and a pointer 43 for marking a point on the scale. The pointer 43 corresponds to the mid-point of the longitudinal axis of horizontal bubble vial 28, enabling the bubble vial 28 to be positioned at a precise point of the surface to be marked, enabling the surface to be simultaneously marked and horizontally aligned.

The protruding end section 33 of sliding clamp 20 is further provided with a marking hole 45. A notch 47 is provided on the outer surface of protruding end section 33.

The sliding clamp 20 may be released by pressing on the main section 31 of clamp 20, at the base of the bubble vial holder 24, releasing the grip of the tabs 34 on the retaining tracks 16. The clamp 20 may then be moved to a required position by applying a lateral force to the bubble vial holder 24. Release of the pressure on the surface of the clamp 20 will restore the gripping force exerted by the tabs 34 on the tracks 16, holding the clamp 20 in a fixed position.

The two sliding clamps 18 and 20, located for use along leveling surface 12 may be removed from the leveling device 10 and replaced at the opposite end of the device at a 180 degree angle to their initial position, thus enabling the clamps 18 and 20 to operate along leveling surface 14 In this arrangement the distances are measured along a scale centered from zero.

It is appreciated that the above description is just one example of a suitable spirit level in accordance with a preferred embodiment of the present invention, but that the invention is not limited to this embodiment but may take other forms within the scope of the invention. For example, the sliding clamps may be any shape suitable for the application and may or may not have marking windows or other features as in a preferred embodiment described herein. It should be noted that the measuring scales can be manufactured in a variety of sizes and lengths and use other scales of measurement or accuracy.

Having described the invention with regard to certain specific embodiments, it is to be understood that the description is not meant as a limitation, since further modifications may now suggest themselves to those skilled in the art, and it is intended to cover such modifications as fall within the scope of the appended claims.

I claim:

1. A device for measuring and leveling as surface comprising:
    a longitudinal element including at least one tapered leveling surface marked for measuring distances between two selected points thereon;
    at least two slidably movable, lockable, pressure releasable, clamps being spaced apart on said leveling surface between two positions corresponding to said selected points;
    a pair of bubble vials each retained in one of said respective clamps, said bubble vials being orthogonally oriented one to another, said orthogonal orientation providing a vertical and horizontal leveling indication between said spaced apart clamp positions such that the device enables measuring on and simultaneous horizontal and vertical leveling the surface.

2. The device of claim 1 in which each of said clamps is formed with a marking window having a pointer.

3. The device of claim 1 in which each of said clamps is formed with a marking notch on an outer edge of a protruding section of said clamp.

4. The device of claim 1 in which each of said clamps is formed with a marking hole on said clamp.

5. The device of claim 1 formed with two parallel retaining tracks running along said longitudinal element parallel to said leveling surface.

6. The device of claim 5 wherein said clamps are each formed on the underside thereof with at least two gripping tabs each of said gripping tabs being insertable into one of said at least two parallel retaining tracks and inwardly slanted to lockingly, pressure releasably, grip edges thereof.

7. The device of claim 1 wherein said clamps are each formed on the upper surface thereof with at least two positioning tabs for enabling application of a lateral force to said clamps.

8. the device of claim 1 having two leveling surfaces, one of said leveling surfaces being provided with a scale increasing from zero, the other said leveling surface being provided with a scale centered from zero, said device being arranged to enable said clamps to be removed from said body of said device, rotated 180 degrees and replaced along the second leveling surface of said body of said device.

9. The device of claim 1 wherein said marked, tapered leveling surface provides means for measuring and marking a surface.

10. The device of claim 1 wherein one of said pair of bubble vials provides means for horizontally aligning a surface.

11. The device of claim 1 wherein one of said pair of bubble vials provides means for vertically aligning a surface.

12. A method for measuring on and leveling a surface comprising the steps of:
    providing a longitudinal element including at least one tapered leveling surface marked for measuring distances between two selected points thereon;
    providing at least two lockable, pressure releasable clamps being spaced apart on said leveling surface between two positions corresponding to said selected points thereon;
    providing a pair of bubble vials each retained in one of said respective clamps, said bubble vials being orthogonally oriented one to another, said orthogonal orientation providing a simultaneous horizontal and vertical leveling indication between said spaced apart clamp positions;
    positioning said device against the surface to be measured and simultaneously horizontally and vertically leveled;
    exerting releasing pressure on said clamps;
    positioning said clamps at points to be measured and simultaneously horizontally and vertically leveled;
    simultaneously horizontally and vertically aligning the device according to said bubble vials and
    measuring a distance between two selected points and leveling said surface in accordance with leveling indications provided by said bubble vials.

13. The method of claim 12 wherein said step of positioning said clamps further comprises the step of marking said surface.

14. The method of claim 13 wherein said marking step is performed by inserting a marking device into notches formed on outer edges of said clamps.

15. The method of claim 13 wherein said marking step is performed by inserting a marking device into marking holes formed on said clamps.

16. The method of claim 13 wherein the step of positioning said clamps is performed by positioning one of said clamps against one of said points and positioning the second of said clamps against the second of said points at a distance measured according to said scale provided on said leveling surface of said device.

* * * * *